(12) United States Patent
Timon et al.

(10) Patent No.: US 6,244,661 B1
(45) Date of Patent: Jun. 12, 2001

(54) VEHICLE SEAT FITTED WITH A LOCKING MECHANISM FOR INCLINING THE SEAT BACK, AND APPARATUS FOR SUCH A SEAT

(75) Inventors: Michel Timon, Fleury sur Orne; Pierre Moradell, St Georges des Groseillers, both of (FR)

(73) Assignee: Bertrand Faure Equipements SA, Boulogne (FR)

( * ) Notice: Subject to any disclaimer, the term of this patent is extended or adjusted under 35 U.S.C. 154(b) by 0 days.

(21) Appl. No.: 09/286,385

(22) Filed: Apr. 5, 1999

(30) Foreign Application Priority Data

Apr. 10, 1998 (FR) .................................................. 98 04564

(51) Int. Cl.⁷ ..................................................... B60N 2/42
(52) U.S. Cl. .................................. 297/378.11; 297/216.13
(58) Field of Search ............................... 297/378.11, 367, 297/216.13, 216.14, 216.15

(56) References Cited

U.S. PATENT DOCUMENTS

| | | |
|---|---|---|
| 3,848,923 | 11/1974 | Dehler . |
| 4,705,319 * | 11/1987 | Bell .................................. 297/378.11 |
| 4,743,067 * | 5/1988 | Pipon et al. ..................... 297/378.11 |
| 5,163,736 | 11/1992 | Aljundi . |
| 5,788,325 * | 8/1998 | Ganot .............................. 297/378.11 |

FOREIGN PATENT DOCUMENTS

| | | |
|---|---|---|
| 2 195 948 | 3/1974 | (FR) . |
| 2 071 756 | 9/1981 | (GB) . |

OTHER PUBLICATIONS

French Preliminary Search Report dated Dec. 1, 1998, Int'l. Appl. No. FR 9804564.

* cited by examiner

*Primary Examiner*—Anthony D. Barfield
(74) *Attorney, Agent, or Firm*—Marshall, O'Toole, Gerstein, Murray & Borun

(57) ABSTRACT

This concerns a vehicle seat including a back pivoting mounted on a seat part by means of a locking mechanism able to be activated by a user to unlock the seat back, the seat comprising additionally an inertia safety device adapted to drive the locking mechanism into its locked position in the event of the vehicle being subjected to an impact. This safety device includes an input component which is driven by the pivoting of the seat back and which is connected to the locking mechanism by means of an inertia clutch.

11 Claims, 4 Drawing Sheets

VEHICLE SEAT FITTED WITH A LOCKING MECHANISM FOR INCLINING THE SEAT BACK, AND APPARATUS FOR SUCH A SEAT

FIELD OF THE INVENTION

The present invention relates to vehicle seats fitted with locking mechanisms for inclining the seat back, and to safety devices for such seats.

More particularly, the invention concerns a vehicle seat including a seat part and a back hereafter called, the one first seat component and the other second seat component, the back being pivoting mounted relative to the seat part around a transverse horizontal axis of rotation, and the back being connected to the seat part by means of at least one locking mechanism controlled by an operating part able to be activated by a user, this operating part being assisted to a neutral position where said operating part places the locking mechanism into a locked position preventing the seat from pivoting, and the operating part being movable to an activating position where said operating part places the locking mechanism into an unlocked position which allows a free pivoting of the back, the seat comprising additionally at least one first inertia safety device adapted to drive the locking mechanism into its locked position in the event of the vehicle being subjected to sudden impact.

BACKGROUND OF THE INVENTION

The document U.S. Pat. No. 5,163,736 describes an example of such a seat, which allows the back of the seat to be locked automatically when the vehicle is subjected to a violent accidental impact, which stops the seat from pivoting freely under the effect of the impact when there is a chance of serious injury to the seat user, if this user is in the process of adjusting the inclination of the seat at the time of the accident.

In this known seat, the inertia safety device includes a balance weight which is normally kept in a neutral position by resilient means, and which is moved into a position where said balance weight controls the locking of the back when the vehicle is subject to acceleration or deceleration above a certain threshold.

This prior art seat has however the drawback that the kinetic energy of the balance weight, used on impact to overcome the force of the resilient means acting upon this balance weight and to lock the seat, is relatively low, given the light weight of the balance weight.

Because of this, on the one hand, it is relatively difficult to calibrate the inertia safety device, and on the other hand, the acceleration or deceleration threshold which triggers the locking of the seat back is quite high, so that said locking is not triggered for relatively slight accidental impacts to which the vehicle is subjected, whereas such impacts can nonetheless cause injuries to the seat passenger if the latter is in the process of adjusting the inclination of his/her seat back at the time of the accident.

Moreover, the operation of this type of inertia safety device is influenced by the inclination of the vehicle or of the seat part of the seat, since this inclination modifies the acceleration or deceleration threshold prompting movement of the balance weight and causing the back to lock.

OBJECTS AND SUMMARY OF THE INVENTION

A particular object of this invention is to overcome these drawbacks.

To this end, according to the invention, a seat of the type in question is essentially characterised in that the first safety device includes an input part which is driven by the relative pivoting of the first and second seat components and which is connected, by means of an inertia clutch, to an output part adapted to control the locking mechanism, said clutch being adapted to be placed into an engaged state to drive the output part in a movement direction allowing this output part to place the locking mechanism into its locked position when the back of the seat pivots in a first angular direction with an angular acceleration above a pre-specified acceleration threshold, the inertia clutch being normally in a disengaged state where said clutch uncouples the output part relative to the input part of the first safety device.

By means of these arrangements, given the relatively heavy weight of the back, the variation in kinetic energy of this back, which occurs during acceleration or deceleration of the vehicle, is relatively high even at levels of acceleration or deceleration corresponding to relatively slight impacts to which the vehicle is subjected in its longitudinal direction, in the direction corresponding to the pivoting of the back in the first above-mentioned angular direction (in practice, the first angular direction generally corresponds to the forward pivoting of the back following a frontal impact to which the vehicle is subjected).

Thus, the safety device of the seat according to the invention can be made more sensitive than prior art safety devices, and its calibration is much less tricky.

Moreover, the seat safety device according to the invention is generally insensitive to the inclination of the vehicle or the seat.

In preferred versions of the invention, use may possibly be made additionally of one and/or the other of the following arrangements:

- the operating part is pivoting mounted around a transverse horizontal axis of rotation, the input and output parts of the safety device being also rotary relative to transverse horizontal axes and the output part being adapted to control said operating part;
- the input part of the safety device is an input toothed wheel which is rotary mounted around the pivoting axis of the seat back and which is fixed to rotate with the second seat component, this input toothed wheel driving (directly or not) an input gear which belongs to the inertia clutch and which is rotary mounted around a transverse horizontal axis relative to the first seat component, the inertia clutch comprising additionally an output gear which is also rotary mounted around a transverse horizontal axis and which is uncoupled from the input gear when the inertia clutch is in its disengaged state, the inertia clutch being adapted to drive said output gear when said clutch is in its engaged state, and the output gear itself driving (directly or not) an output toothed wheel which is fixed to rotate with the operating part of the locking mechanism and which constitutes the output part of the safety device;
- the operating part is pivoting mounted relative to the first seat component, the neutral position and the activating position of this operating part being fixed relative to said first seat component;
- the input and output gears of the inertia clutch are rotary mounted around a common axis of rotation, the input gear being fixed to rotate with a support part which carries a ratchet movable between, on the one hand, an active position where said ratchet engages with teeth integral with the output gear to drive said output gear in an angular direction corresponding to the movement of the operating part to its activating position, and the ratchet being assisted resiliently to a neutral position where said ratchet does not engage with said teeth integral with the output gear, the inertia clutch comprising additionally a flywheel which is freely rotary mounted around the common axis of rotation of the input and output gears and which comprises a stop part engaging with the ratchet to drive said flywheel to rotate when the seat back pivots in the first angular direction, this stop part being adapted to move the ratchet into its active position under the effect of the inertia of the flywheel when the seat back pivots in said first angular direction with an angular acceleration above said pre-specified acceleration threshold, the safety device comprises a gear train adapted so that, when the seat back pivots with a certain angular speed and the inertia clutch is in its engaged state, said safety device makes the operating part pivot with an angular speed higher than the angular speed of the seat back;

the first angular direction corresponds to the forward pivoting of the seat back;

the seat back comprises an upper part in mechanical connection with a safety belt;

the first angular direction corresponds to the backward pivoting of the seat back;

the seat comprises a second safety device which includes an input part driven by the pivoting of the seat back, this input part being connected, by means of an inertia clutch, to an output part adapted to control the locking mechanism, said inertia clutch being adapted to be placed in an engaged state to drive the output part of the second safety device in a direction of movement allowing this output part to move the locking mechanism into its locked position when the seat back pivots in a second angular direction opposite to the first angular direction with an angular acceleration above a pre-specified acceleration threshold, the inertia clutch of the second safety device being normally in a disengaged state where said clutch uncouples the output part relative to the input part of the second safety device.

Furthermore, the object of the invention is also a safety device for a seat as defined above.

BRIEF DESCRIPTION OF THE DRAWINGS

Other characteristics and advantages of the invention will appear during the following description of two of its versions, given as non-restrictive examples, in conjunction with the appended drawings.

In the drawings.

MORE DETAILED DESCRIPTION

In the different figures, the same references denote identical or similar components.

Figure 1:
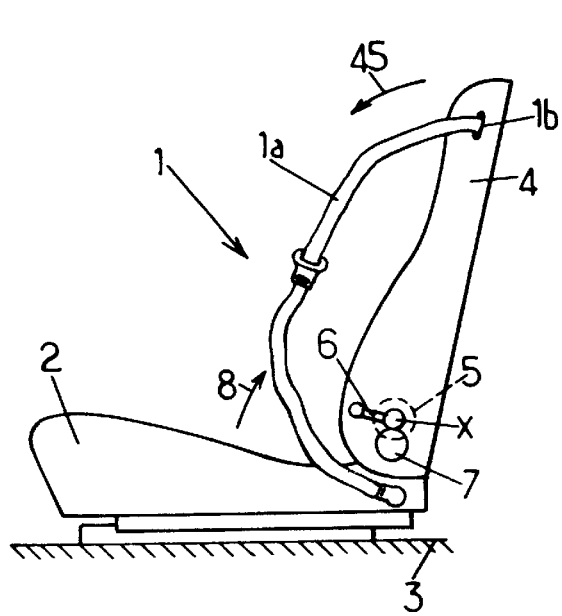
FIG. 1 is a diagrammatic side view of a seat according to a first version of the invention, fitted with a seat back locking mechanism and a safety device allowing the seat back to be locked in the event of an accident.

As shown diagrammatically in FIG. 1, the invention concerns a vehicle seat 1, particularly an automobile vehicle front seat, which comprises, on the one hand, a seat part 2 mounted on the floor 3 of the vehicle, and on the other hand, a seat back 4 pivoting mounted on the seat part 2 around a transverse horizontal axis X.

Moreover, in the example considered, the seat comprises a safety belt 1*a* the upper part of which slides in a guide 1*b* integral with the upper part of the seat back 4, to reach a seat belt winder (not shown) contained in said seat back.

The rigid frame of the back is connected to the rigid frame of the seat part, at least on one side of the seat, by a locking mechanism 5 which is controlled by a handle 6 pivoting around the axis X and which is connected to an inertia safety device 7.

The handle 6 is assisted resiliently to a neutral angular position, shown in FIG. 1, where said handle places the locking mechanism 5 into a locked state which locks the pivoting of the seat back 4.

Activating the handle 6, in the angular direction 8 shown in FIG. 1, allows the locking mechanism 5 to be unlocked, in such a way that the seat user can adjust the inclination of the back 4 by acting directly on this back, said back being generally assisted forwards by at least one spring (not shown).

Numerous examples of locking mechanisms usable in the present invention are known in the prior art.

Figure 3:
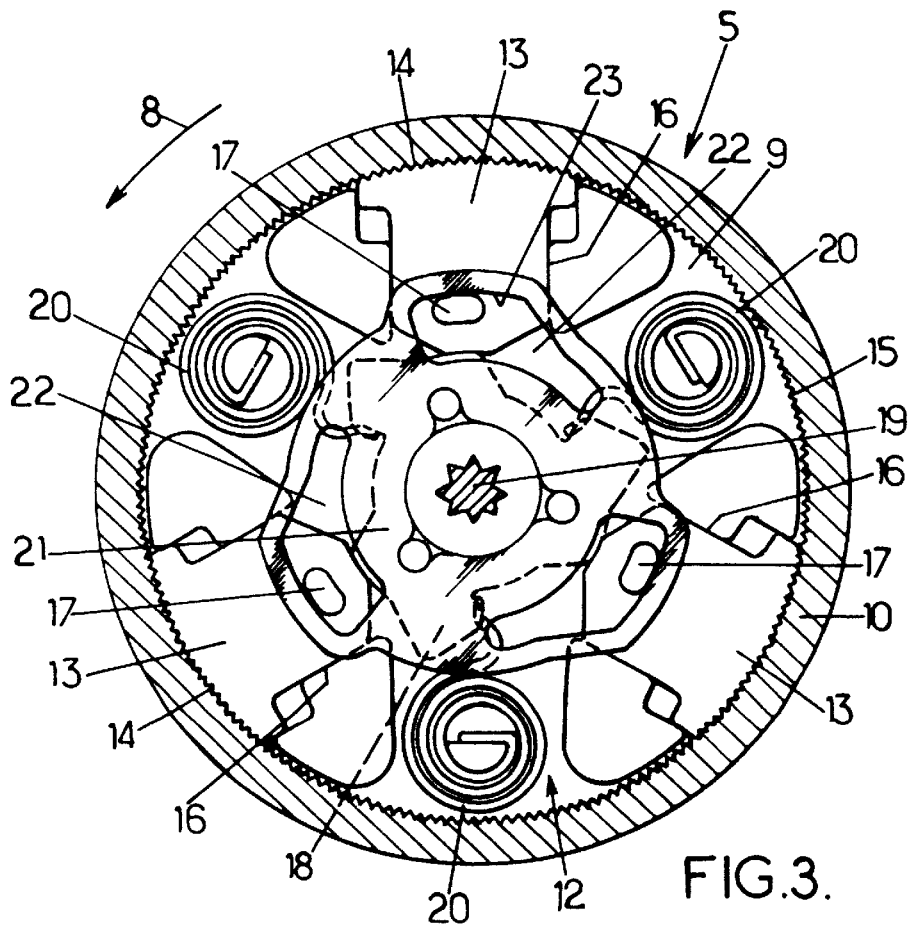
Figure 2:
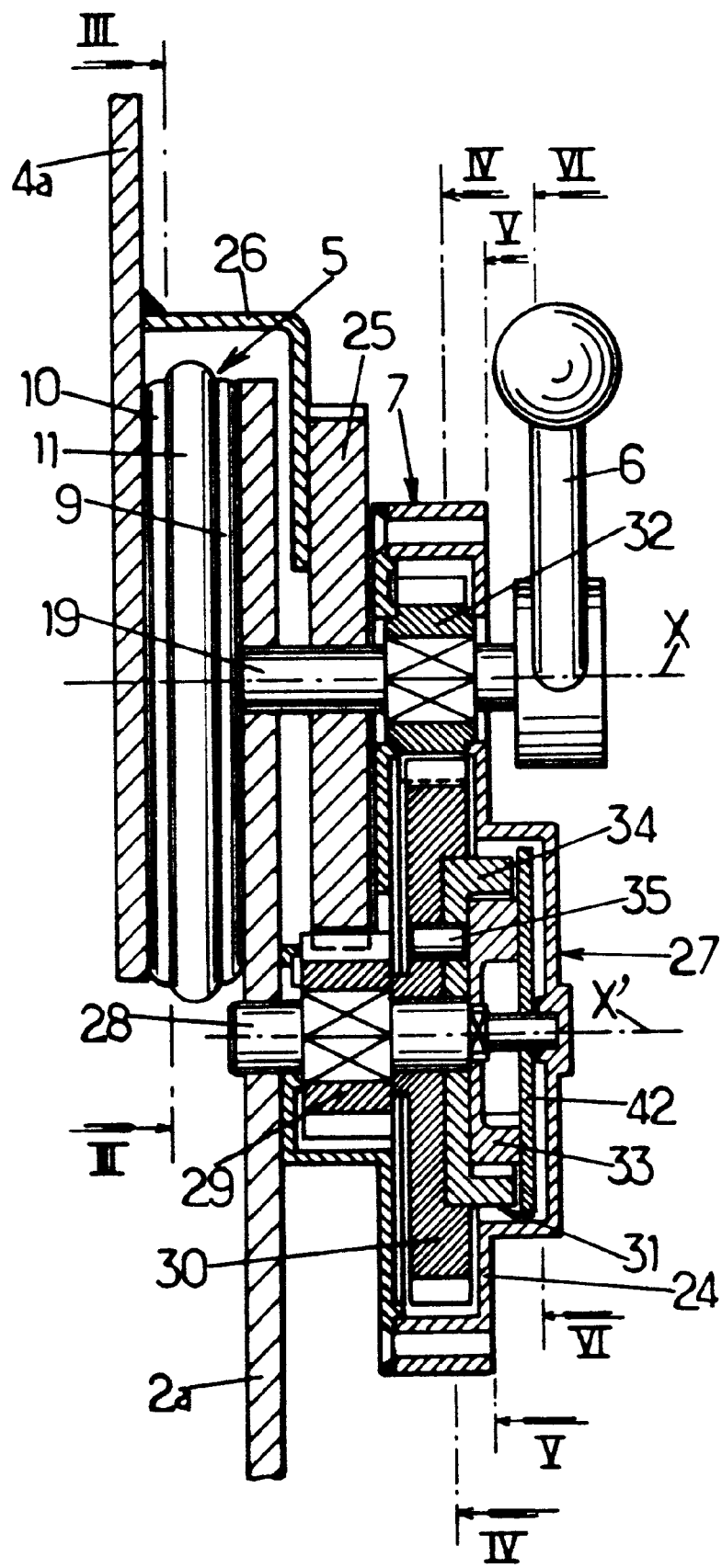
FIG. 2 is a partial axial cross section view of the locking mechanism and of the seat safety device in FIG. 1, FIGS. 3 to 6 are transverse sectional views, along the lines II—II, IV—IV, V—V, and VI—VI respectively in FIG. 2.

For example, as shown in FIGS. 2 and 3, the locking mechanism 5 can include:

a so-called fixed metal web 9, which extends perpendicularly to the axis X and which in the example considered is fixed to the rigid frame 2*a* of the seat part, a so-called movable web 10, which extends perpendicularly to the axis X and which in the example considered is fixed to the frame 4*a* of the back, a metal ring 11, which is crimped on the periphery of the fixed and movable webs delimiting with them a closed circular casing, and a locking device with inserts 12, which is contained in said casing and which is adapted to immobilise the movable web 10 relative to the fixed web 9 while the handle 6 is in its neutral position.

As shown in FIG. 3, the locking mechanism 12 includes, in the example considered:

three locking metal inserts 13, which are placed at 120° to each other and which each have external teeth 14 adapted to mesh with internal circular teeth 15 provided in the movable web 10, each of these inserts being radially sliding mounted in a guide 16 which is integral with the fixed web 9, in such a way that the inserts are movable between on the one hand, an engagement position where the teeth 14 of these inserts are meshed with the teeth 15 of the movable web to lock the locking mechanism 5, and on the other hand, a withdrawn position where the inserts 13 do not engage with the teeth 15 of the movable web, each insert being able to comprise additionally a peg 17 which projects axially towards the movable web 10, a metal cam 18 which pivots around the axis X and which is fixed to the handle 6 by means of a control shaft 19, the cam 18 and the handle 6 being able to pivot between, on the one hand, a neutral angular position (fixed relative to the seat part in the example considered) and, on the other hand, an activating angular position (fixed relative to the seat part in the example considered), springs 20 which are mounted on the fixed web 9 and which assist the cam 18 to its neutral position, where it places the inserts 13 into their engagement position, said cam being able to pivot in the angular direction 8 as far as its activating position when the handle 6 is activated allowing the inserts 13 to slide towards their withdrawn position, which unlocks the locking mechanism 5, and a rigid metal plate 21 which is connected rigidly to the cam 18 and which extends radially between said cam and the mobile web 10 partially covering the inserts 13, this small plate comprising three cut-outs 22 in which are engaged the pegs 17 of the inserts, each of these pegs engaging with a cam edge 23 which delimits the corresponding cut-out radially outwards and which is configured to move the corresponding insert radially inwards when the cam rotates in the angular direction 8.

Figure 4:
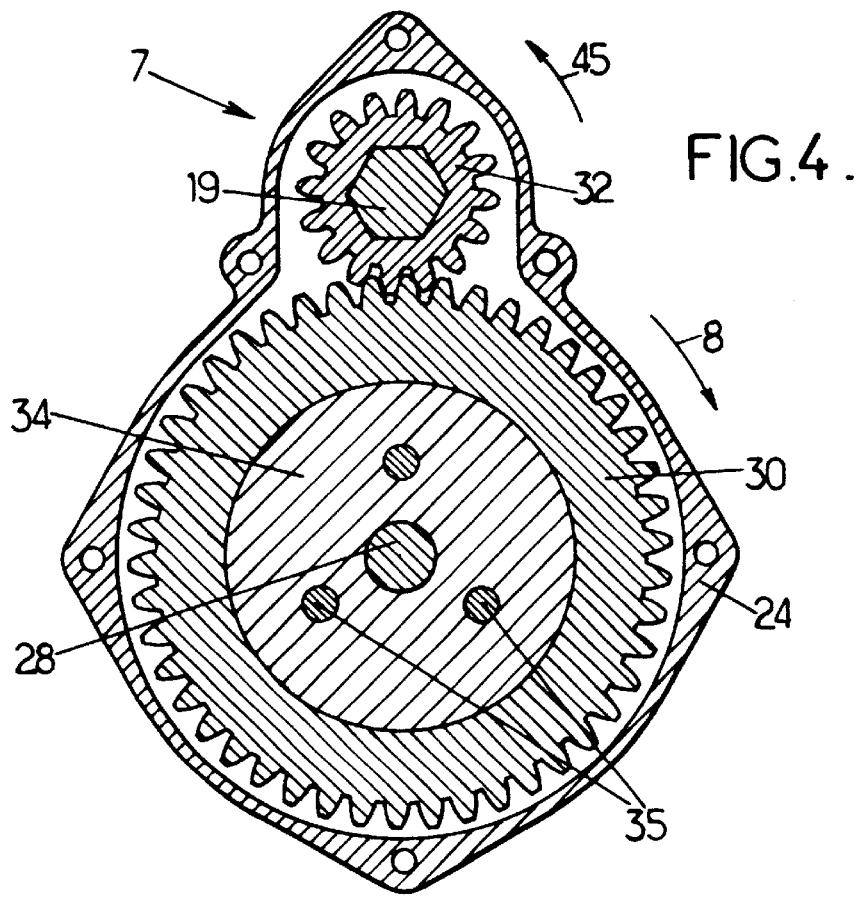

Furthermore, as can be seen in FIGS. 3 and 4, the safety device 7 comprises a housing 24 which is fixed to the seat part web 2a, and this safety device includes:

a toothed wheel 25 which is rotary mounted around the control shaft 19 and which is fixed to the seat back web 4a, for example by means of a rigid clip 26 fixed to this web, an inertia clutch 27 including a shaft 28 which rotates on the seat part web 2a along a transverse horizontal axis of rotation X', an input gear 29 which is fixed to rotate with the shaft 28 and which is meshed with the toothed wheel 25, and an output gear 30 which is freely rotary mounted on the shaft 28, the output gear being normally uncoupled from the input gear, and said output gear being able to be coupled to the input gear by means of a coupling device 31 which will be described in more detail below, and a toothed wheel 32 fixed to rotate with the control shaft 19 of the locking mechanism 5.

Apart from the toothed wheel 25, all the components of the safety device 7 are contained in the housing 24.

Figure 5:
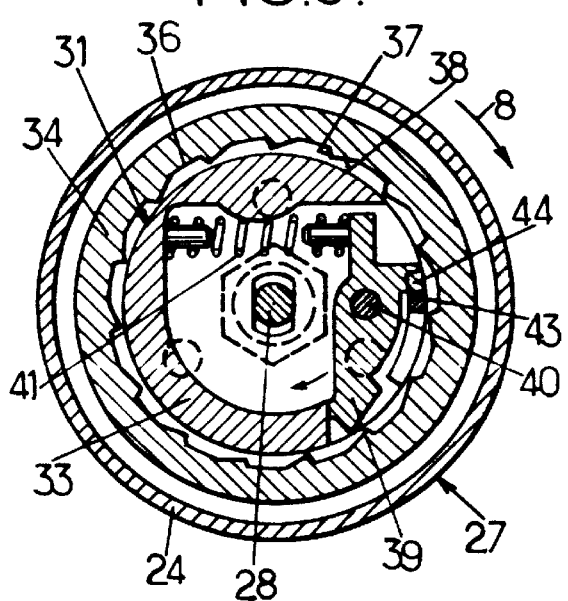
Figure 6:
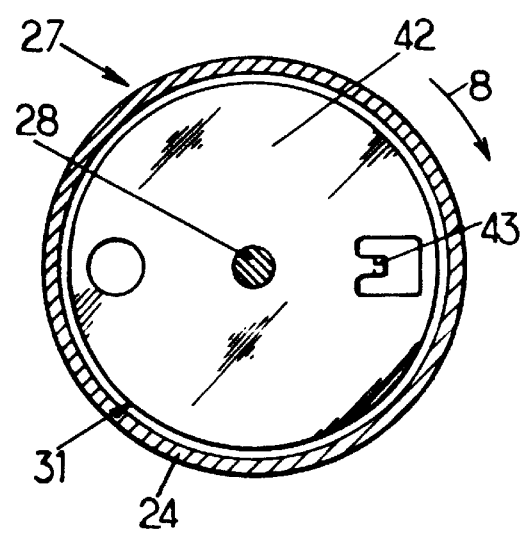

Furthermore, as shown in detail in FIGS. 2, 5 and 6, the coupling device 31 of the inertia clutch includes.

a support disk 33 which is fixed to rotate with the shaft 28 and with the gear 29 of the clutch, a web 34 in the shape of a cylindrical cap, which is fixed to rotate with the output gear 30 of the clutch, for example by means of cotter pins 35, and which comprises internal teeth 36 constituted by a set of dissymetric teeth each having a stop face 37 slightly inclined relative to the radial direction and a cam face 38 strongly inclined relative to the radial direction, a ratchet 39 which is mounted on a pivot 40 parallel to the shaft 28 and which is movable between, on the one hand, a withdrawn position where said ratchet does not engage with the internal teeth 36, and on the other hand, an active position where the free end of the ratchet abuts against the stop faces 37 of the teeth 36 in such a way to allow the web 34 and the output gear 30 to be driven only in the angular direction 8, a spring 41 which is carried by the support disk 33 and which assists the ratchet 39 towards its withdrawn position, and a flywheel 42 which is in the form of a metal disk freely pivoting mounted on the shaft 28, this flywheel comprising an activating pin 43 which is cut out in the disk 42 and which is folded towards the ratchet 39, this activating pin 43 pressing against a lever 44 of the ratchet 39 to assist said ratchet towards its active position when the shaft 28 of the lock rotates in the angular direction 8, which corresponds to a forward pivoting of the seat back in the angular direction 45 shown in FIG. 1.

The spring 41 and the weight of the flywheel 42 are adjusted in such a way that, when the seat back 4 pivots forwards, in the angular direction 45, with an angular acceleration above a pre-specified threshold which can be for example between 4 and 8 rad.s$^{-2}$, the activating pin 43 moves the ratchet 39 into its active position, with the result that said ratchet drives the output gear 30 in the angular direction 8 (see FIG. 4), which corresponds to a pivoting of the control shaft 19 and the handle 6 in the angular direction 45, opposite to the angular direction 8.

In this way, if the seat passenger is in the process of adjusting the inclination of his/her seat when the vehicle is subjected to frontal impact, the forward movement of the seat back 4, under the effect of the weight of this back and under the action of the safety belt 1a, triggers the operation of the inertia clutch 27, which automatically returns the handle 6 to its neutral position and re-locks the locking mechanism 5.

Thus is avoided the free forward pivoting of the back 4, which could cause serious injuries to the user.

Furthermore, it will be noted, in such a hypothetical case, the locking of the back is almost instantaneous, given the fact that the safety device 7 constitutes a multiplying gear train which, when the inertia clutch 27 is in its engaged position, causes the control shaft 19 to pivot generally at least five times more rapidly than the back pivots, for example about eight to ten times more rapidly.

For example, if the activating travel of the handle 6 is of the order of 30°, the safety device 7 can be designed in such a way that a pivoting of the back 4 on a travel of about 3 to 4° brings the handle 6 back to its neutral position.

Figure 7:
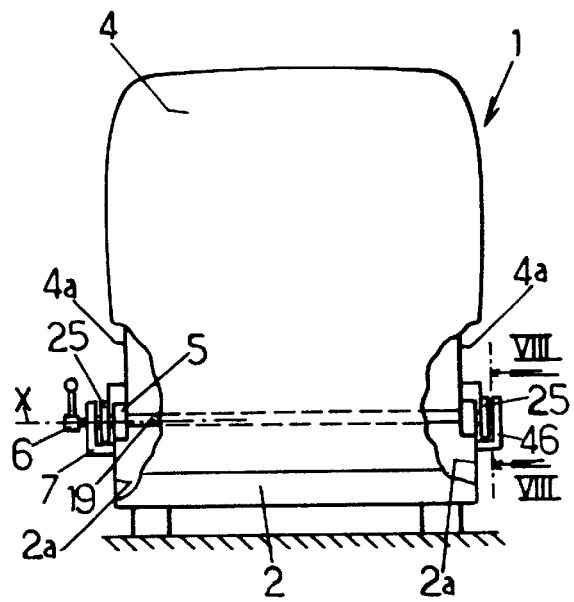
FIG. 7 is a partially cut-away, diagrammatic rear view, of a seat according to a second version of the invention.
Figure 8:
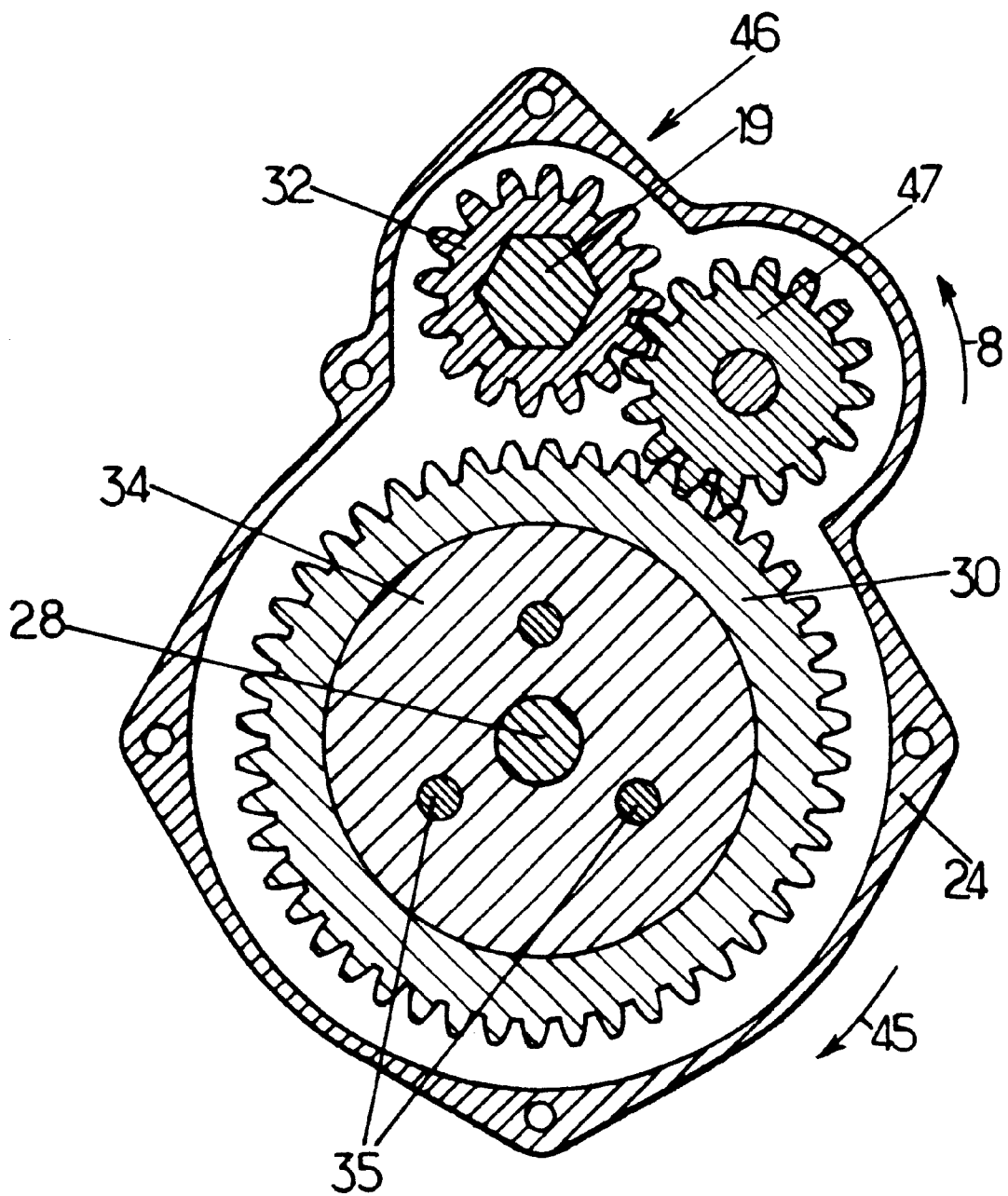
FIG. 8 is a sectional view along the line VIII—VIII in FIG. 7.

Furthermore, in the second version of the invention, shown in FIGS. 7 and 8, the seat comprises, on one side, the locking mechanism 5 and the safety device 7 described above, and on the opposite side, an additional locking mechanism 5 (if need be eliminated) and a safety device 46 which is differentiated from the safety device 7 solely by the fact that the output gear 30 of the inertia clutch is not directly meshed with the teeth 32, but meshes with an intermediate gear 47 itself meshing with the teeth 32, these teeth 32 of the safety device 45 being fixed to rotate with the above-mentioned control shaft 19, which passes through the whole width of the seat and which connects with the handle 6.

The safety device 46 being placed symmetrically to the safety device 7 relative to the median plane of the seat, the inertia clutch of this safety device 46 is placed into its engaged state when the seat back 4 pivots backwards in the angular direction 8 with an acceleration above the above-mentioned pre-specified threshold, which corresponds to a rotation of the shaft 28 in the angular direction 45, whence a rotation of the intermediate gear 47 in the angular direction 8 and a rotation of the toothed wheel 32 and of the control shaft 19 in the angular direction 45 corresponding to the re-locking of the locking mechanisms 5.

Thus is avoided the free pivoting of the seat back if the seat passenger is in the process of adjusting the inclination of the back at the time when the vehicle is subjected to an impact from the rear.

Clearly, the invention would also be applicable in the event of the angular activating direction of the handle being inverted relative to the angular direction 8 described above.

In this case, it would be possible for example to provide an intermediate gear similar to the gear 47 in the safety device 7, and to eliminate said intermediate gear 47 in the safety device 46, the output gear 30 of the inertia clutch of this safety device 46 being then directly meshed with the toothed wheel 32.

We claim:

1. A vehicle seat including a seat part and a back hereafter called, the one first seat component and the other second seat component, the back being pivoting mounted relative to the seat part around a transverse horizontal axis of rotation, and the back being connected to the seat part by means of at least one locking mechanism controlled by an operating part able to be activated by a user, this operating part being assisted to a neutral position where said operating part places the locking mechanism into a locked position preventing the back from pivoting, and the operating part being movable to an activating position where said operating part places the locking mechanism into an unlocked position which allows a free pivoting of the back, the seat comprising additionally at least one first inertia safety device adapted to drive the locking mechanism into its locked position in the event of the vehicle being subjected to sudden impact, wherein the first safety device includes an input part which is driven by the relative pivoting of the first and second seat components and which is connected, by means of an inertia clutch, to an output part adapted to control the locking mechanism, said clutch being adapted to be placed into an engaged state to drive the output part in a direction of movement allowing this output part to place the locking mechanism into its locked position when the back of the seat pivots in a first angular direction with an angular acceleration above a pre-specified acceleration threshold, the inertia clutch being normally in a disengaged state where said clutch uncouples the output part relative to the input part of the first safety device.

2. A seat according to claim 1, wherein the operating part is pivoting mounted around a transverse horizontal axis of rotation, the input and output parts of the safety device being also rotary relative to transverse horizontal axes, and the output part being adapted to control said operating part.

3. A seat according to claim 2, wherein the input part of the safety device is an input toothed wheel which is rotary mounted around the pivoting axis of the seat back and which is fixed to rotate with the second seat component, this input toothed wheel driving an input gear which belongs to the inertia clutch and which is rotary mounted around a transverse horizontal axis relative to the first seat component, the inertia clutch comprising additionally an output gear which is also rotary mounted around a transverse horizontal axis and which is uncoupled from the input gear when the inertia clutch is in its disengaged state, the inertia clutch being adapted to drive said output gear when said clutch is in its engaged state, and the output gear itself driving an output toothed wheel which is fixed to rotate with the operating part of the locking mechanism and which constitutes the output part of the safety device.

4. A seat according to claim 3, wherein the operating part is pivoting mounted relative to the first seat component, the neutral position and the activating position of this operating part being fixed relative to said first seat component.

5. A seat according to claim 3, wherein the input and output gears of the inertia clutch are rotary mounted around a common axis of rotation, the input gear being fixed to rotate with a support part which carries a ratchet movable between, on the one hand, an active position where said ratchet engages with teeth integral with the output gear to drive said output gear in an angular direction corresponding to the movement of the operating part to its activating position, and the ratchet being assisted resiliently to a neutral position where said ratchet does not engage with said teeth integral with the output gear, the inertia clutch comprising additionally a flywheel which is freely rotary mounted around the common axis of rotation of the input and output gears and which comprises a stop part engaging with the ratchet to drive said flywheel to rotate when the seat back pivots in the first angular direction, this stop part being adapted to move said ratchet into its active position under the effect of the inertia of the flywheel when the seat back pivots in said first angular direction with an angular acceleration above said pre-specified acceleration threshold.

6. A seat according to claim 2, wherein the safety device comprises a gear train adapted so that, when the seat back pivots with a certain angular speed and the inertia clutch is in its engaged state, said safety device makes the operating part pivot with an angular speed higher than the angular speed of the seat back.

7. A seat according to claim 1, wherein the first angular direction corresponds to the forward pivoting of the seat back.

8. A seat according to claim 7, wherein the seat back comprises an upper part in mechanical connection with a safety belt.

9. A seat according to claim 1, wherein the first angular direction corresponds to the backward pivoting of the seat back.

10. A seat according to claim 1, wherein a second safety device which includes an input part driven by the pivoting of the seat back, this input part being connected, by means of an inertia clutch, to an output part adapted to control the locking mechanism, said inertia clutch being adapted to be placed in an engaged state to drive the output part of the second safety device in a direction of movement allowing this output part to move the locking mechanism into its locked position when the seat back pivots in a second angular direction opposite to the first angular direction with an angular acceleration above a pre-specified acceleration threshold, the inertia clutch of the second safety device being normally in a disengaged state where said clutch uncouples the output part relative to the input part of the second safety device.

11. An apparatus for a vehicle seat including a seat part and a back hereafter called, the one first seat component and the other second seat component, the back being pivoting mounted relative to the seat part around a transverse horizontal axis of rotation, said apparatus comprising at least one locking mechanism which is destined to connect the back to the seat part and which is controlled by an operating part able to be activated by a user, this operating part being assisted to a neutral position where said operating part places the locking mechanism into a locked position preventing the back from pivoting, and the operating part being movable to an activating position where said operating part places the locking mechanism into an unlocked position which allows a free pivoting of the back, and said apparatus further comprising a safety device including an input part which is destined to be driven by the relative pivoting of the first and second seat components and which is connected, by means of an inertia clutch, to an output part adapted to control the locking mechanism, said clutch being adapted to be placed into an engaged state to drive the output part in a direction of movement allowing this output part to place the locking mechanism into its locked position when the back of the seat pivots in a first angular direction with an angular acceleration above a pre-specified acceleration threshold, the inertia clutch being normally in a disengaged state where said clutch uncouples the output part relative to the input part of the first safety device.

* * * * *